US008155633B2

(12) United States Patent
Theppasandra

(10) Patent No.: US 8,155,633 B2
(45) Date of Patent: Apr. 10, 2012

(54) WHO-CALLED SYSTEM FOR DETECTING AND REPORTING SLAMDOWN CALLS IN A MOBILE NETWORK

(75) Inventor: Janardhan Theppasandra, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 491 days.

(21) Appl. No.: 12/401,558

(22) Filed: Mar. 10, 2009

(65) Prior Publication Data

US 2010/0234003 A1  Sep. 16, 2010

(51) Int. Cl.
 H04M 3/42 (2006.01)
(52) U.S. Cl. ............... 455/417; 455/415; 455/414.1
(58) Field of Classification Search .................. 455/415, 455/417, 414.1
 See application file for complete search history.

(56) References Cited

U.S. PATENT DOCUMENTS

| | | | |
|---|---|---|---|
| 6,311,057 B1 | 10/2001 | Barvesten | |
| 2003/0199274 A1 | 10/2003 | Lim | |
| 2005/0047561 A1 | 3/2005 | Seiferth | |
| 2005/0069109 A1 | 3/2005 | Elias et al. | |
| 2006/0222152 A1* | 10/2006 | Elias et al. | 379/88.13 |
| 2006/0252425 A1* | 11/2006 | Jiang | 455/432.1 |
| 2007/0197213 A1* | 8/2007 | Weintraub et al. | 455/433 |
| 2007/0213050 A1* | 9/2007 | Jiang | 455/432.3 |
| 2009/0061854 A1* | 3/2009 | Gillot et al. | 455/432.1 |

FOREIGN PATENT DOCUMENTS

| | | |
|---|---|---|
| JP | 2005322974 | 11/2005 |
| KR | 20030083209 | 10/2003 |
| WO | WO-03/024143 | 3/2003 |

OTHER PUBLICATIONS

3GPP TS 29.002 V6.1.0 (Mar. 2003) Technical Specification, 3rd Generation Partnership Project, Technical Specification Group Core Network, Mobile Application Part (MAP) specification, Release 6, pp. 1-500 (Part 1 of 3).
3GPP TS 29.002 V6.1.0 (Mar. 2003) Technical Specification, 3rd Generation Partnership Project, Technical Specification Group Core Network, Mobile Application Part (MAP) specification, Release 6, pp. 501-1000 (Part 2 of 3).

(Continued)

*Primary Examiner* — Kent Chang
*Assistant Examiner* — Ronald Eisner
(74) *Attorney, Agent, or Firm* — Perkins Coie LLP

(57) ABSTRACT

A system and method to detect and provide information related to slamdown calls placed to a subscriber's mobile device. In one embodiment, a who-called server is implemented as part of a GSM network that uses a CAMEL protocol. The who-called server receives a CAMEL-based trigger when an incoming call placed to the subscriber's mobile device is deflected to a forwarded entity. In some instances, the who-called server ensures that the incoming call was deflected because the subscriber's mobile device was unreachable. The who-called server then determines whether the calling party abandons the incoming call before incoming call is answered by the forwarded entity. If the calling party does abandon the incoming call, the who-called server captures the calling party's identification information. The who-called server, in some instances, transmits the identification information to the subscriber after the subscriber's mobile device switches from the unreachable state to a reachable state.

46 Claims, 6 Drawing Sheets

OTHER PUBLICATIONS

3GPP TS 29.002 V6.1.0 (Mar. 2003) Technical Specification, 3rd Generation Partnership Project, Technical Specification Group Core Network, Mobile Application Part (MAP) specification, Release 6, pp. 1001-1339 (Part 3 of 3).

3GPP TS 03.78.V 6.11.1 (Aug. 2002), Customized Applications for Mobile Enhanced Logic (CAMEL), Phase 2, Stage 2 (Release 1997), 199 pages.

International Search Report and Written Opinion for PCT/US2010/026718, mailed Sep. 29, 2010, 8 pages.

* cited by examiner

WHO-CALLED SYSTEM FOR DETECTING AND REPORTING SLAMDOWN CALLS IN A MOBILE NETWORK

BACKGROUND

When the user of a mobile device (e.g., a cell phone) does not answer an incoming call, or when the calling party disconnects the call before the user can answer, the user receives a "missed call" or a similar indicator. The "missed call" feature tracks and reports to the user information related to the unanswered calls. However, to detect such missed calls, the user's mobile device must be powered on and be within the service coverage area of a servicing mobile network when the incoming call is received.

If the user's mobile device is powered off or if the user's mobile device is outside of the service coverage area, the user does not receive a missed call notification or any such indicator to let her know that she received a call from the calling party. In such scenarios, where the user's mobile device is unreachable, the incoming call is forwarded either to a voicemail account or to a call-forward number indicated by the user. The user would be aware that a call was received only when, for example, the calling party leaves a voicemail or when someone answers the call at the call-forwarded leg.

Certain calls, where the calling party abandons (i.e., disconnects) the call before depositing a voice mail (when the call is forwarded to a voicemail account) or before someone answers the call at the call-forwarded leg (when the call is forwarded to a call-forward number), are referred to herein as "slamdown" calls. In such situations, the user is not aware of any slamdown calls she may have received while her mobile device was unreachable.

To detect and report information related to calls received by an unreachable mobile device, prior art solutions utilize a trigger mechanism during the call-handling stage. Examples of such prior art solutions include U.S. patent application Ser. No. 10/448286 and U.S. patent application Ser. No. 08/883004. However, such prior art solutions are disadvantageous for at least the following reasons.

First, the prior art solutions detect and report any call that is forwarded to the user's voicemail or a call-forward number. The triggering mechanism used by the prior art solutions generates triggers (e.g., DP3 triggers) any time a call is deflected or forwarded to a voicemail account or a call-forward number. The trigger gets generated regardless of whether the user's mobile device is reachable or not. Therefore, in situations where the incoming call was forwarded when the user's mobile device was reachable (e.g., when the call was forwarded because the user did not answer the call), the user would unnecessarily receive multiple notifications of the same event. For example, the user would receive a first notification through the trigger mechanism, and a second notification through the regular "missed call" feature.

Second, the prior art solutions are incapable of detecting true slamdown calls. As discussed above, the prior art trigger mechanisms detect and report any call that is forwarded or deflected to a voicemail account or a call-forward number. However, if a calling party leaves a message (in the case of a voicemail account), or if someone answers the incoming call (in the case of a call-forwarded situation), the user would become cognizant of the identity of the calling party. Therefore, the user may consider an additional notification (from the triggering mechanism) superfluous or unnecessary in such non-slamdown calls because she is already aware of the calling party's identity.

Third, the triggering mechanism of the prior art solutions are number-based triggers. Such a triggering mechanism generates a trigger when the incoming call is forwarded to a specific number (e.g., a number associated with the voicemail account). If, for example, the operator of the mobile network uses multiple voicemail accounts, the operator would be encumbered with the burden of enabling the trigger for each number associated with the various voicemail accounts.

Fourth, the triggering mechanism of prior art solutions is generic to the entire mobile network. The prior art triggering mechanism, if implemented within the network, applies to all users of the network. The mechanism cannot be enabled specifically for targeted users, and cannot be linked to a user's subscription profile. Therefore, the operator would be unable to offer the call detect feature as a premium service to selected users of the mobile network.

DETAILED DESCRIPTION

Figure 1:
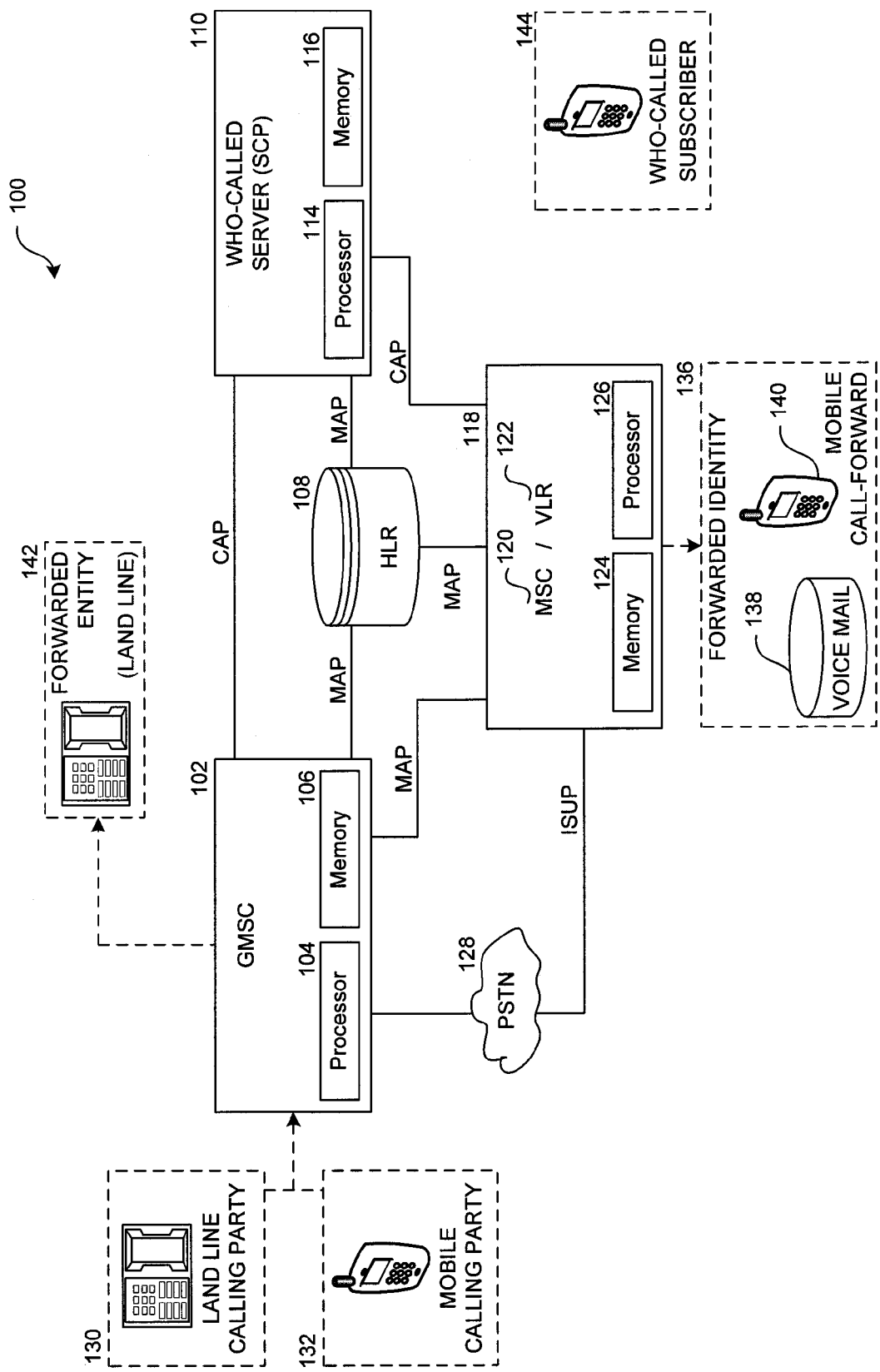
FIG. 1 depicts an exemplary CAMEL network environment for establishing a who-called service.

A system and method that allows a who-called server to detect and provide information related to slamdown calls to a mobile subscriber is disclosed. In one embodiment, the who-called server is implemented as part of a Global System for Mobile Communications (GSM) network that utilizes a Customized Application of Mobile Enhanced Logic (CAMEL) protocol.

In some embodiments, a GSM network implemented using the CAMEL protocol (a "CAMEL network") uses a Gateway Mobile Switching Center (GMSC) to receive an incoming call placed to the subscriber's mobile device. If the subscriber's mobile device is in an unreachable state, either a Mobile Switching Center (MSC) or the GMSC of the CAMEL network deflects the incoming call to a forwarded entity. A forwarded entity, as described herein, refers to either a voicemail account or a communication device associated with a call-forward number. The MSC deflects the incoming call when the subscriber's mobile device is outside of a coverage area of the MSC. The GMSC deflects the call when the subscriber's mobile device is powered off.

The deflecting party (i.e., either the MSC or the GMSC) transmits a CAMEL based trigger (e.g., a CAMEL Originating Forwarded IDP trigger) to the who-called server subsequent to deflecting the incoming call. The CAMEL based trigger is generated when the incoming call is deflected to any forwarded entity irrespective of the phone number associated with the forwarded entity. Additionally, the CAMEL based trigger (e.g., the CAMEL Originating Forwarded IDP trigger) is part of the subscriber's profile maintained by the CAMEL network. Because the trigger is based on the subscriber's profile, the operator of the CAMEL network may enable the CAMEL based trigger mechanism on a targeted basis to selected subscribers.

Upon receiving the trigger, in some instances, the who-called server reads a redirection reason included in the trigger to ascertain that the incoming call was deflected because of the unreachable state of the subscriber's mobile device. By verifying the reason for deflection, the who-called server ensures that the incoming call is reported only when the incoming call was received during an unreachable state of the subscriber's mobile device. If the who-called server determines that the call was deflected for other reasons (e.g., when the call was deflected because the subscriber did not answer the incoming call, etc.), the who-called server allows the incoming call to proceed to the forwarded entity without capturing or reporting the identify of the calling party.

In some embodiments, the who-called server transmits an event-detection routine to the deflecting party. The event-detection routine monitors the incoming call and reports any change in state of the incoming call back to the who-called server. If the calling party abandons the call before the forwarded entity answers the call, the who-called server determines that a slamdown event has occurred. In a call-forward scenario, the incoming call is considered "answered" when, for example, someone answers the incoming call at the call-forwarded leg. In a voicemail situation, the incoming call is considered "answered" after, for example, the completion of any voicemail greeting and at the moment the calling party gets an opportunity to deposit a voicemail.

Subsequent to detecting the slamdown event, the who-called server captures and stores identification information related to the calling party. When the subscriber reenters the mobile network (i.e., when the subscriber's mobile device switches from the unreachable state to a reachable state), the who-called server formats and forwards the identification information to the subscriber.

By detecting that a slamdown event happened subsequent to receiving the CAMEL based trigger, the who-called server ensures that incoming calls are reported for "pure" slamdown calls, i.e, when the subscriber's mobile device is in an unreachable state and when the calling party abandons the call before the forwarded entity answers the incoming call.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

In some embodiments, operators of Global System for Mobile Communications (GSM) networks utilize a Customized Application of Mobile Enhanced Logic (CAMEL) protocol to offer several operator-specific services ("CAMEL services") to their subscribers. CAMEL enables the operators to offer CAMEL services to their subscribers even when the subscribers are roaming outside of their home network. Examples of the CAMEL services include caller ID, call screening, call forwarding, call rerouting, profile-based premium services, etc. The CAMEL protocol is defined in a set of standards established by the ETSI (European Telecommunication Standardization Institute) as part of 3GPP (Third Generation Partnership Project). Specifications for these standards can be found at www.3gpp.orq.

FIG. 1 depicts an exemplary CAMEL network 100 environment for establishing a who-called service. In one embodiment, the exemplary CAMEL network 100 includes a Home Location Register (HLR) 108, which, for example, holds Camel Subscription Information (CSI) for each subscriber (e.g., a who-called subscriber 144) in the CAMEL network. The CSI for a subscriber can include, for example, subscription information regarding call processing and call feature enhancement, subscriber profile information, subscriber's call forwarding options, subscriber's subscription to enhanced services (e.g., subscriber's subscription to the who-called service), etc.

The exemplary CAMEL network 100 further includes a Mobile Switching Center/Visiting Location Register (MSC/VLR) 118. The MSC/VLR 118 includes a Mobile Switching Center (MSC) 120, a memory 124, a processor 126, and a database of mobile subscribers operating within the MSC's service area, known in the art as a Visiting Location Register (VLR) 122. When a mobile subscriber enters an area served by the MSC 120, the subscriber's location is updated in the HLR 108 to point to the VLR 122. The HLR 108 communicates with the VLR 120 utilizing a Mobile Application Part (MAP) standard. The MAP standard is a Signaling System Number 7 (SS7) protocol that provides an application layer for the various nodes within the CAMEL network to communicate with each other.

In some instances, when the user enters an area served by the MSC 120, the VLR 122 is updated to also include the subscriber's Originating Camel Subscription Information (OCSI). The OCSI is, for example, a set of information provisioned in the HLR 108 for control of a mobile originating call (i.e., where the subscriber originates a call from her mobile device). Similarly, Terminating Camel Subscription Information (TCSI) is, for example, a set of information provisioned in the HLR 108 for control of a mobile terminating call (i.e., where the subscriber receives a call on her mobile device from a calling party).

In some instances, the OCSI and TCSI may contain certain trigger information. A trigger is the term used to define specific call-processing logic associated with a given point in a call. In some instances, triggers are implemented as software routines that are loaded in the CAMEL network 100 to carry out instructions based on an analysis of conditions at a detection point of the trigger.

The exemplary CAMEL network 100 further includes a who-called server 110, which essentially operates as a Service Control Point (SCP) of the CAMEL network 100. The who-called server 110 includes a processor 114 and a memory 116. The who-called server 110 also includes, for example, a management component to implement service control logic during processing of incoming or outgoing calls. In one illustrative example, the who-called server 110 receives an OCSI- or TCSI-based trigger from the MSC 120 during an incoming call to a subscriber's mobile device (e.g., 144). The who-called server 110 may then execute one or more software routines (e.g., using the service control logic of the management module) to determine whether the incoming call can proceed to a next state. The CAMEL network 100 utilizes a CAMEL Application Part (CAP) standard to effectuate communication between the MSC 120 and the who-called server 110.

In one exemplary illustration, the who-called server 110 may execute a routine to determine whether a slamdown event occurred subsequent to receiving an OCSI- or TCSI-based trigger from the MSC 120. Upon detecting the occurrence of a slamdown event, the who-called server 110 may then execute a series of additional routines to collect and process information related to the slamdown event. Such operations of the who-called server, as will be discussed in further detail in the following sections, are collectively referred to herein as the "who-called service."

It should be noted that the OCSI and TCSI are provisioned as part of the subscriber's profile in the HLR 108, allowing the operator of the CAMEL network 100 to have sufficient flexibility to offer the who-called service on a targeted basis to selected subscribers. The operator may do this by "arming" various CAMEL trigger detection points in the subscriber's profile. A particular CAMEL trigger detection point is "armed" if it has been activated and is available for use during the processing of a call. Consequently, in some instances, this flexibility enables the operator to offer the who-called service as a premium service to only those subscribers that opt to pay a premium for the who-called service.

The exemplary CAMEL network 100 of FIG. 1 also depicts network elements that are used to process, for example, an incoming (terminating) call to a subscriber's mobile device. When a calling party places an incoming call (either using a landline device 130 or a mobile device 132) to the subscriber, the incoming call is received by a Gateway Mobile Switching Center (GMSC) 102. The GMSC also includes a processor 104 and a memory 106. The GMSC 102 signals the incoming call to the MSC 120 of the CAMEL network 100. The signaling is accomplished using an ISDN User Part (ISUP) standard, which is part of the SS7 communications protocol for signaling calls in a Public Switched Telephone Network (PSTN) 128.

As indicated previously, when a subscriber updates his location (e.g., when the subscriber enters the service area of the MSC 120), the subscriber's OCSI information is downloaded to the VLR 122. In some instances, the OCSI information includes any call-forward functionality set up by the subscriber. If the subscriber's mobile device 144 becomes unreachable at any point, incoming calls to the subscriber's mobile device 144 are directed to either a call-number indicated in the call-forward functionality, or to a default receiving component (e.g., a voicemail account) of the CAMEL network 100. A subscriber's mobile device 144 becomes unreachable either when the subscriber's mobile device 144 is outside of the MSC's 120 service area, or when the subscriber's mobile device 144 is powered off.

When the subscriber has enabled the call-forward functionality, the MSC 120 forwards incoming calls to the subscriber's unreachable mobile device to a phone number indicated by subscriber. This phone number may be associated with either a mobile device 140 or a landline device 142. However, when the subscriber has not set up any call-forward functionality, the MSC 120, for example, forwards incoming calls to a default receiving component when the subscriber's mobile device 144 is unreachable. A non-limiting example of such a receiving component is a voicemail account 138 assigned to the subscriber.

The previous discussion provided a brief, general description of a suitable environment in which the system can be implemented. Although not required, aspects of the invention are described herein in the general context of computer-executable instructions, such as routines executed by a general-purpose data processing device, e.g., a wireless device, a server computer or a personal computer. Those skilled in the relevant art will appreciate that the invention can be practiced with other communications, data processing, or computer system configurations, including: Internet appliances, handheld devices (including personal digital assistants (PDAs) and digital music players), all manner of mobile phones, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor. Aspects of the invention may be stored or distributed on computer-readable media, including magnetically or optically readable computer discs, hard-wired or preprogrammed chips (e.g., EEPROM semiconductor chips), or other data storage media. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), ISUP, SS7, or the Internet. In a distributed computing environment, program modules may be located in both local and remote memory storage devices. Moreover, while the who-called server is described as being implemented in the Global System for Mobile Communications (GSM) environment, it will be appreciated that the who-called server may be implemented in other environments, such as Code Division Multiple Access (CDMA), Digital AMPS (IS-136/TDMA), and Integrated Digital Enhanced Network (iDEN) environments, provided that analogous signaling information is available in such environments. Additionally, the who-called server may be implemented using one or more servers of computing systems.

Figure 2A:
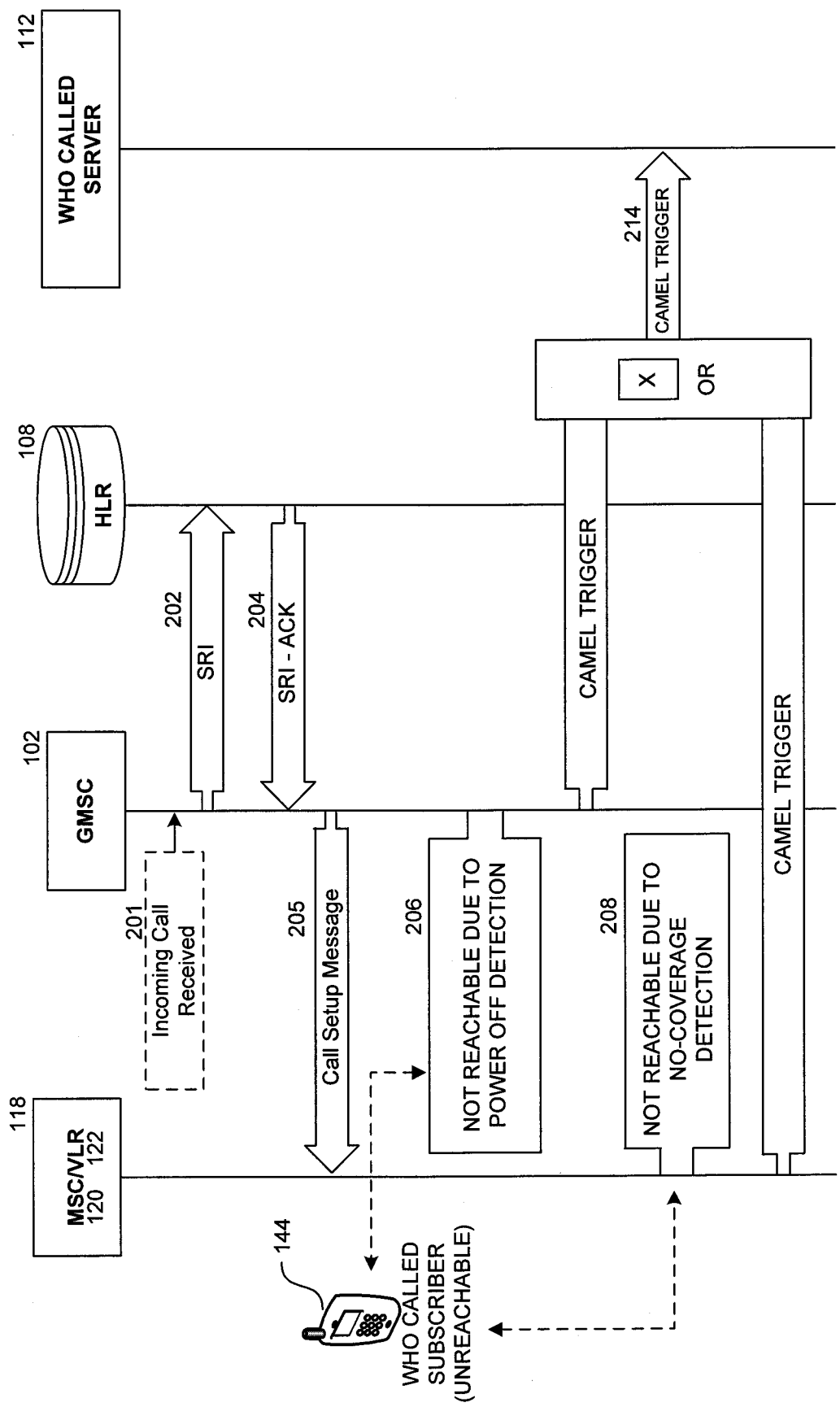
FIGS. 2A-2C depict an exemplary call flow for an incoming call placed to a subscriber's mobile device when the subscriber's mobile device is unreachable.
Figure 2B:
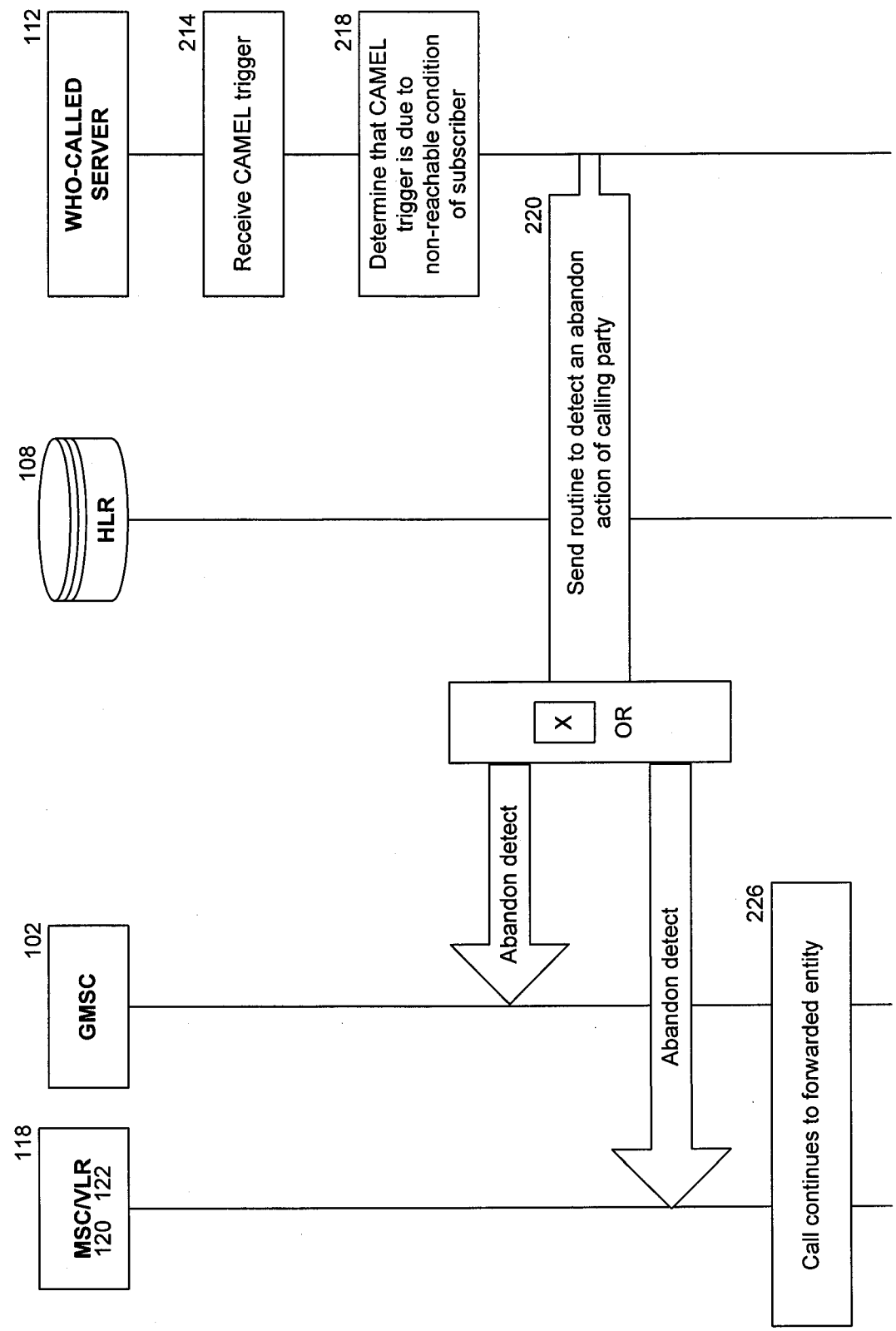
Figure 2C:
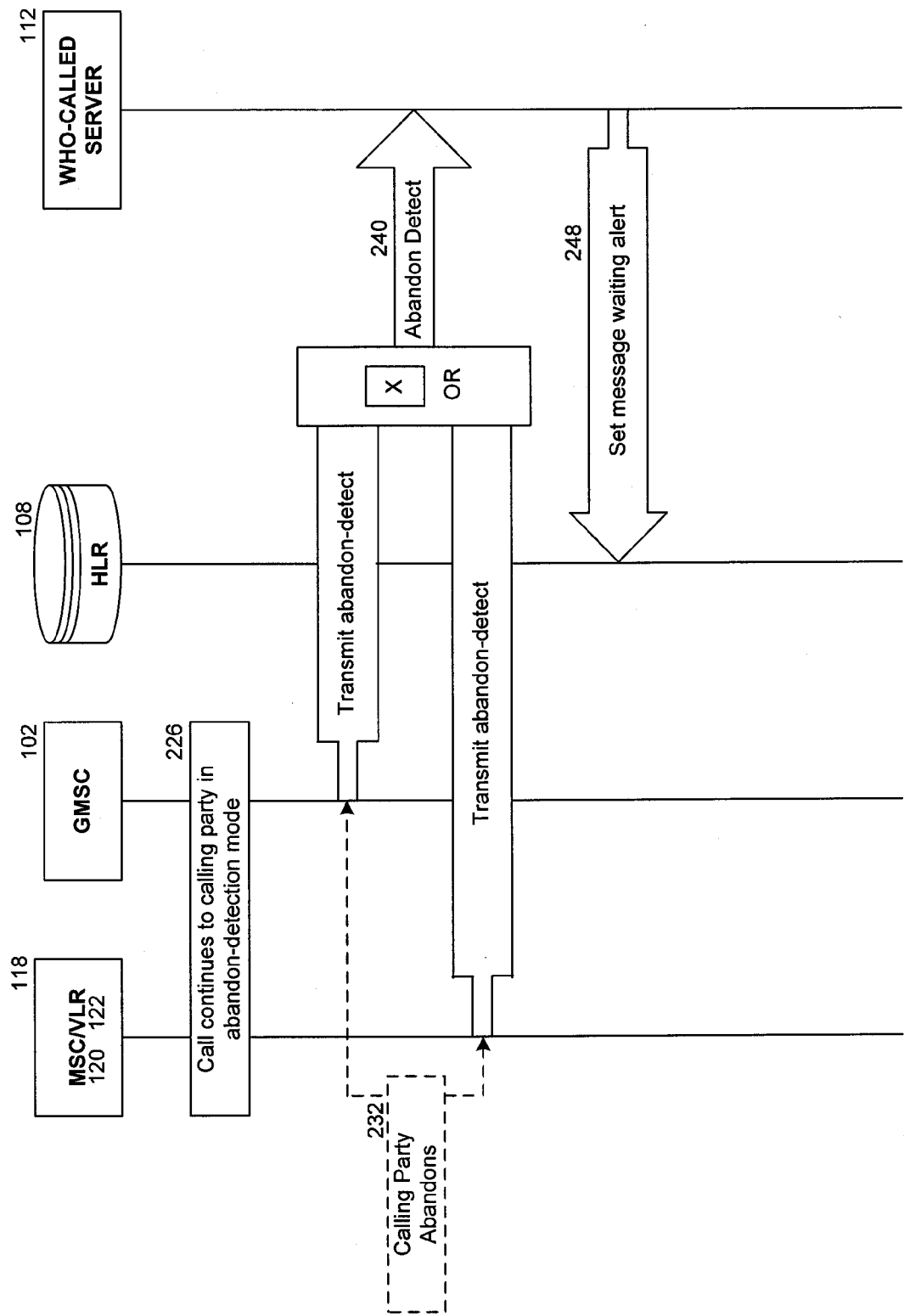

FIGS. 2A-2C depict an exemplary call flow of an incoming call placed to a subscriber's mobile device 144 when the subscriber's mobile device is unreachable. The subscriber's mobile device 144 may be unreachable, for example, because the subscriber's mobile device 144 is powered off or the subscriber's mobile device is outside of the service area of the MSC 120.

As shown in FIG. 2A, the GMSC 102 receives an incoming call 201 from a calling party. The calling party may use either a landline or a mobile device to place the incoming call. The GMSC 102 responds by sending a Send Routing Information (SRI) request 202 to the HLR 108 to obtain necessary information to set up the incoming call. In some instances, as previously noted, the HLR 108 contains OCSI and TCSI information associated with the subscriber. The OCSI and TCSI include information related to trigger detection points that are specifically armed for the subscriber. The HLR 108, in some instances, also includes information about a forwarded entity to which calls may be forwarded to.

A forwarded entity, as described herein, refers to a setup that receives incoming calls placed to the subscriber's mobile device 144, when the subscriber's mobile device is, for example, in an unreachable state (i.e., when the subscriber's mobile device is powered off or when it is outside of the service area of the MSC 120). In some instances, the forwarded entity may include any setup associated with a call-forward number assigned by the subscriber. For example, the subscriber may assign a landline number or a mobile number to which the incoming calls should be forwarded to. When the subscriber assigns such a call-forward number, incoming calls to the subscriber's mobile device 144 are forwarded (e.g., when the mobile device 144 is in an unreachable state) to a communication device associated with the call-forward number.

In other instances, the forwarded entity may include a voicemail setup associated with the subscriber. In such a case, incoming calls to an unreachable mobile device are forwarded to the voicemail setup. The voicemail setup could include, for example, a voicemail service offered to the subscriber by the operator of the mobile network. The voicemail setup may also include a voicemail service offered by a third-party provider. The subscriber may choose a third-party provider of his own choice, or may choose a third-party provider associated with the operator of the mobile network. Each of these voicemail services may be uniquely associated with a specific voicemail service number.

Referring to FIG. 2A, the HLR 108 transmits TCSI information, along with information related to the forwarded entity (e.g., call-forward number, voicemail service number, etc.) to the GMSC 102 through an SRI-acknowledge message 204. The GMSC 102 and the HLR 108 communicate using the MAP standard.

The following discussion of the call handling assumes that the subscriber has opted for the who-called service, i.e., that the CAMEL trigger detection points have been "armed" for the subscriber.

When an incoming call is placed to the subscriber's mobile device, the GMSC 102 receives the incoming call and transmits a call setup message to the MSC 120 to proceed with the call flow. If the subscriber's mobile device 144 is in an unreachable state, the call is deflected by either the MSC 120 or the GMSC 102 to a forwarded entity. For example, when the subscriber's mobile device 144 is powered off, the GMSC 102 detects the unreachable state 206 and deflects (or forwards) the call to the forwarded entity. Similarly, for example, when the subscriber's mobile device 144 is outside of the service area of the MSC 120, the MSC detects the unreachable state 208 and deflects the call to the forwarded entity.

Subsequent to deflecting the incoming call to the forwarded entity, the deflecting entity (i.e., either the MSC 120 or the GMSC 102) transmits a CAMEL trigger 214 (e.g., an Originating Forward Initial Detection Point Trigger) to the who-called server 112. It should be noted that the CAMEL trigger is generated and transmitted to the who-called server 214 when the MSC or the GMSC deflects the incoming call to any forwarded entity. Unlike triggers used in non-CAMEL environments, the CAMEL triggers (e.g., the OCSI based triggers) are not generated based on the incoming call being forwarded to any particular number. The CAMEL trigger is generated when the call is forwarded to any forwarded entity, and is not tied to one or more phone numbers or other identifiers associated with the forwarded identity.

In some instances, the CAMEL trigger 214 received by the who-called server 112 includes identification information about the calling party (e.g., calling party number, calling time, etc.). In some instances, the CAMEL trigger 214 may also include a "redirection reason" to indicate the reason for deflection of the incoming call. This redirection reason may be, for example, a binary code embedded in the CAMEL trigger 214. The binary code may have one of several specific values, each specific value corresponding to a particular reason for deflection of the incoming call. Some examples of such a redirection reason include deflection due to no reply from a reachable mobile device, deflection due to an unreachable state of the mobile device, deflection due to a busy response from a reachable mobile device, etc.

FIG. 2B depicts the call flow of the incoming call subsequent to the who-called server 112 receiving the CAMEL trigger 214. As previously indicated, the who-called server 112 receives the CAMEL trigger 214 from either the MSC 120 or the GMSC 102. The who-called server 112 then performs logic computations to determine the reason the CAMEL trigger 214 was generated (i.e., the reason the incoming call was deflected). In some instances, for example, the who-called server 112 reads the redirection reason included in the CAMEL trigger 214 to determine the reason for deflection. The who-called server then confirms that the incoming call was deflected because the subscriber's mobile device 144 was in an unreachable state 218.

Subsequent to confirming the reason for deflection, the who-called server sends an event-detection routine to the deflecting entity (i.e., either the GMSC 118 or the MSC 102) to determine an "abandon before answer" action of the calling party 220. The event-detection routine monitors the state of the incoming call to determine whether the calling party disconnects (i.e., abandons) the call before the forwarded entity answers the call. The incoming call is considered to be answered if, for example, a receiving party at a call-forwarded number answers the incoming call. However, if, for example, the incoming call is routed to a voicemail box of the forwarded entity, the call is considered to be "answered" at the moment the calling party gets an opportunity to leave a message after hearing a voicemail greeting. In such instances, the incoming call is not considered to have been answered during the playback of the voicemail greeting.

FIG. 2C depicts the call flow of the incoming call subsequent to receiving the event-detection routine from the who-called server 112. After receiving the event-detection routine, the deflecting party allows the incoming call to proceed to the forwarded entity, as indicated in step 226. The event-detection routine, as explained above, monitors a change in state of the incoming call to determine whether the call is abandoned or answered. If the calling party abandons the incoming call (as indicated in step 232) before the forwarded entity answers the call, the corresponding deflecting party (i.e., either the MSC 120 or the GMSC 102) transmits an abandon-detect message 240 to the who-called server 112.

Upon receipt of the abandon-detect message, the who-called server 112 determines that a slamdown event has occurred. The identification information of the calling party is contained in the CAMEL trigger 214 received by the who-called server, and the who-called server 112 captures the identification information directly from the CAMEL trigger 214. The identification information may include, for example, the phone number of the calling party, a caller-ID associated with the phone number of the calling party, the time of the incoming call, etc. It should be noted, however, that the who-called server 112 may capture and store identification information of the calling party at any point during the call flow. In one example, the who-called server 112 may capture the identification information after receiving the CAMEL trigger 214. In another example, the who-called server 112 may capture the identification information after sending out the event-detection routine 220 or after receiving the abandon-detect message 240.

After storing the identification information of the calling party, the who-called server 112 transmits a message-waiting alert 248 to the HLR 108. Upon the subscriber coming back to the network (i.e., when the subscriber switches from an unreachable state to a reachable state), the HLR 108 uses the message-waiting alert 248 to send a notification to the who-called server 112. After receiving the notification, the who-called server 112 proceeds to transmit information related to any detected slamdown calls to the subscriber.

Figure 3A:
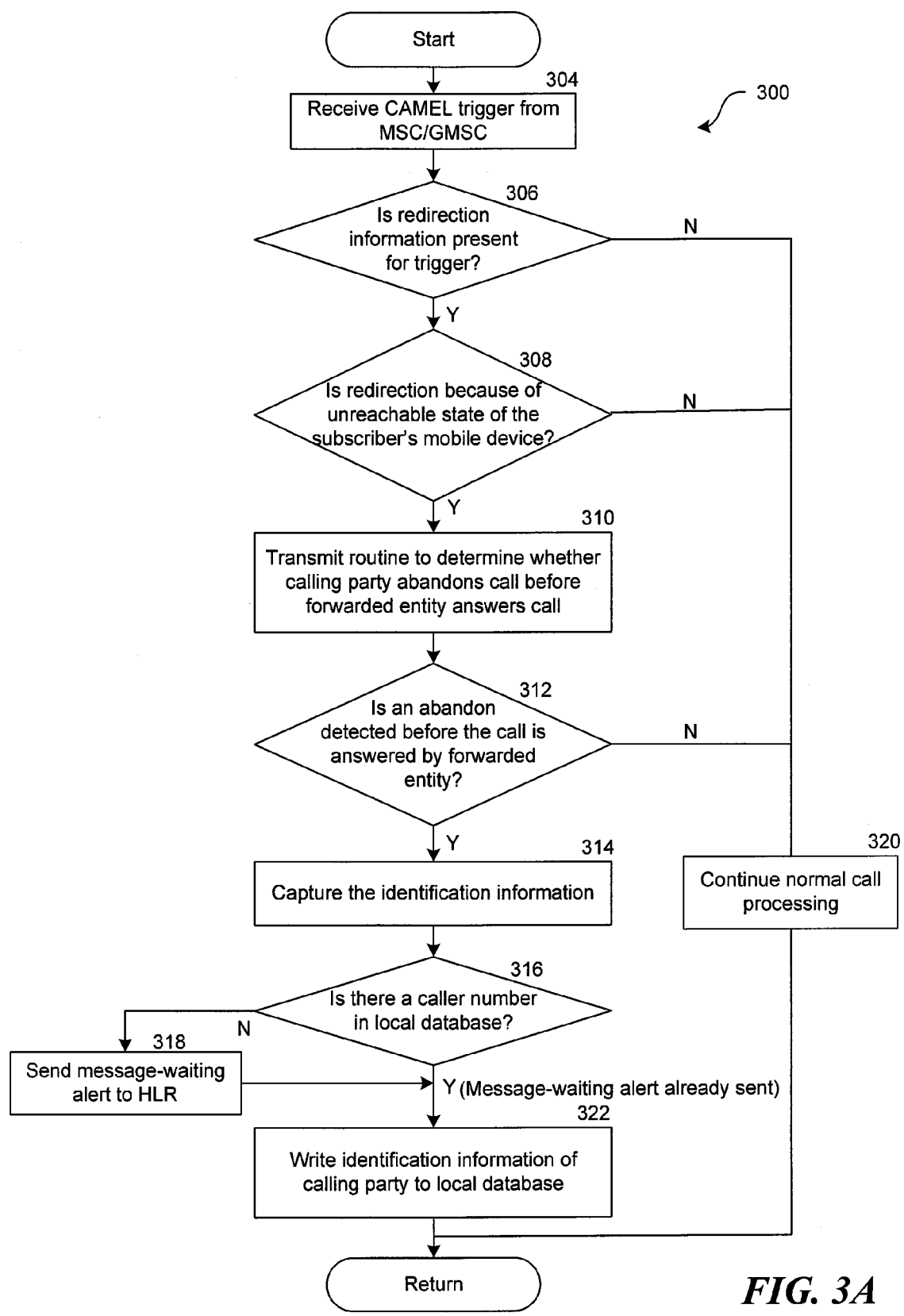
FIG. 3A is a flow diagram of a process implemented at a who-called server to detect a slamdown call and capture information related to a calling party that placed the slamdown call.

FIG. 3A is a flow diagram of a process 300 implemented at the who-called server to detect a slamdown call and capture information related to a calling party that placed the slamdown call. At block 304, the who-called server receives a CAMEL trigger from a deflecting entity. The deflecting entity, as discussed above, forwards an incoming call to a forwarded entity when the subscriber's mobile device is in an unreachable state. The deflecting entity may be the MSC or the GMSC. The MSC is the deflecting entity when the incoming call is forwarded because the subscriber's mobile device is outside of the service area of the MSC. The GMSC is the deflecting entity when the incoming call is forwarded because the subscriber's mobile device is powered off.

At block 306, the who-called server determines whether a redirection reason is included in the CAMEL trigger. The redirection reason provides information about why the MSC or the GMSC forwarded the call to the forwarded entity. If a redirection reason is not included in the CAMEL trigger, the who-called server releases control of the incoming call. The incoming call then continues through normal call processing to the forwarded entity 320. The redirection reason, in some instances, may be a binary code having one of several values. The who-called server may use, for example, a look-up table to read the binary code and determine the redirection reason as indicated in the lookup table. At block 308, the who-called server determines (based on the redirection reason) whether the incoming call was deflected because the subscriber's mobile device was unreachable.

If the redirection reason indicates that the incoming call was deflected because of the unreachable state of the subscriber's mobile device, processing proceeds to block 310. However, if the redirection reason indicates that the incoming call was deflected because of any other reason (e.g., the subscriber's mobile device was busy, the subscriber did not answer the incoming call, etc.), processing proceeds to block 320, where the who-called server releases control of the incoming call.

At block 310, subsequent to determining that the incoming call was deflected because of the unreachable state of the subscriber's mobile device, the who-called server transmits an event-detection routine to the deflecting entity (i.e., to either the MSC or the GMSC). The who-called server then lets the call proceed to the forwarded entity. The event-detection routine monitors any change in state of the incoming call (e.g., whether the call is answered by the forwarded entity, whether the call is abandoned by the calling party, etc.), as indicated in block 312. The event-detection routine reports any such change in state to the who-called server.

If the who-called server determines that the call was answered by the forwarded entity, the who-called server releases control of the incoming call, as indicated in block 320. However, if the who-called server determines that the calling party abandoned the incoming call before establishing a connection with the forwarded entity (i.e., before the forwarded entity answers the incoming call), the who-called server allows processing to proceed to block 314.

At block 314, the who-called server captures identification information of the calling party. In some instances, the identification information may already be present in the CAMEL trigger previously received by the who-called server. In other instances, the who-called server may send separate routines to the deflecting entity (i.e., the MSC or the GMSC) to obtain identification information of the calling party.

In some instances, the who-called server maintains a local database to temporarily save identification information. The identification information from the local database is processed and transmitted to the subscriber after the subscriber's mobile device switches to a reachable state (i.e., when the subscriber's mobile device is powered on and is within the service area of the MSC). The information in the local database is flushed out after sending the information to the subscriber.

At block 316, the who-called server verifies whether any identification information has already been saved in the local database. If the local database is empty (i.e., it does not have any identification information), the who-called server transmits a message-waiting alert to the HLR, as indicated in block 318. Processing then proceeds to block 322, where the who-called server saves the identification information to the local database. However, at block 316, if the who-called server determines that identification information already exists in the local database, the who-called server recognizes that a message-waiting alert was previously sent to the HLR (for the previously saved identification information), and so proceeds directly to saving the new identification information in the local database at block 322.

It should be noted that identification information of the calling party is captured and reported subsequent to detecting a true slamdown call (i.e., when the subscriber's mobile device is unreachable, and when the incoming call is abandoned before being answered by a forwarded entity). Therefore, the subscriber receives identification information related to such true slamdown calls. In contrast, prior art methods capture and report all calls forwarded to a forwarded entity. The prior art methods do not verify that the call was forwarded because of the subscriber's unreachable state. The prior art methods also do not verify that the incoming call is abandoned before the forwarded entity answers the call. Therefore, in such prior art methods, the subscriber is inundated with identification information related to all incoming calls that were forwarded to a forwarded entity, regardless of whether the incoming calls already registered as missed calls (e.g., when the incoming call is forwarded because the subscriber's mobile device was busy) or whether the forwarded entity already answered the call (e.g., the caller left a voicemail).

Figure 3B:
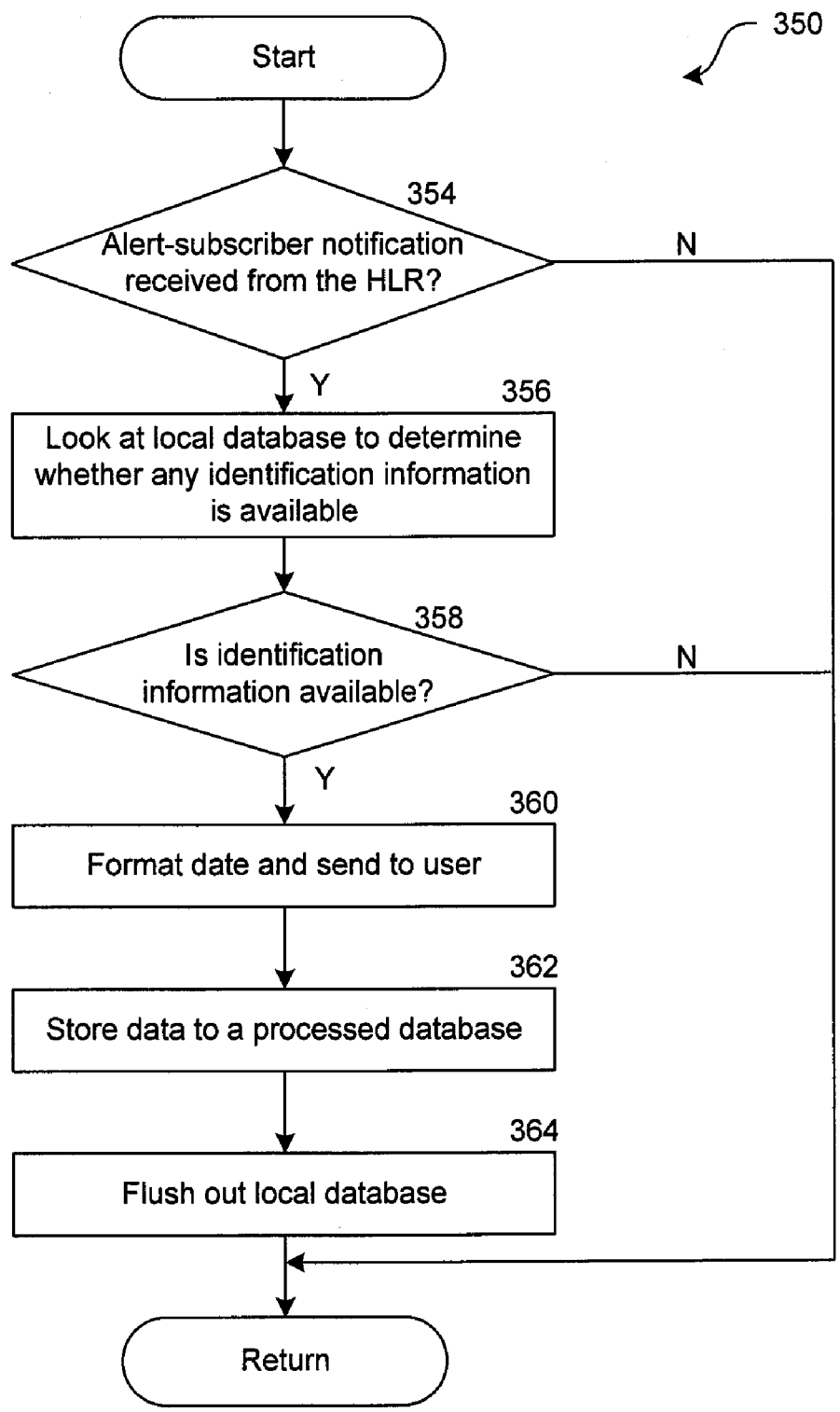
FIG. 3B is a flow diagram of a process implemented at the who-called server to transmit identification information related to slamdown calls to a subscriber.

FIG. 3B is a flow diagram of a process 350 implemented at the who-called server to transmit identification information related to slamdown calls to a subscriber. When the subscriber's mobile device switches from the unreachable state to a reachable state (i.e., the subscriber's mobile device is powered on and is within the service area of the MSC), the HLR verifies whether it previously received a message-waiting alert from the who-called server. If the HLR did receive a message-waiting alert, it sends a alert-subscriber notification to the who-called server when the subscriber's mobile device switches to a reachable state. The who-called receiver receives the notification from the HLR, as indicated in block 354. Upon receiving the notification, at block 356 the who-called server queries the local database to determine whether any identification information is available.

If the who-called server determines that identification information related to one or more slamdown calls are available in the local database at a block 358, the who-called server formats the identification information and transmits it to the user at a block 360. The identification information, for example, may include a phone number of the calling party, any caller ID information associated with the phone number, the time of call, etc. The who-called server transmits the formatted data, for example, in the form of an SMS message to the subscriber's mobile device. In some instances, for example, the who-called server uses a USSD service to transmit the formatted data to the subscriber's mobile device. In other instances, for example, the who-called server may use a WAP push service to transmit the data to a web-server. In such instances, the subscriber would be able to view the data using, for example, a web browser. It is noted that additional examples of transmission of messages to the subscribers, as understood by people of ordinary skill in the art, are suitable for use in implementing the alerting service of the who-called server.

In some instances, at a block the who-called server stores the transmitted data in a processed database that is different from the local database. The processed database allows the who-called server to reconstruct, if necessary, prior information that has been transmitted to users. The who-called server flushes out all the identification information stored in the local database at a block 364, subsequent to transmitting the information to the subscriber and storing the information in the processed database.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc. Software or firmware to implement the techniques introduced here may be stored on a machine-readable medium and may be executed by one or more general-purpose or special-purpose programmable microprocessors. A "machine-readable medium," as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM), random access memory (RAM); magnetic disk storage media, optical storage media, flash memory devices, etc.).

Although the present invention has been described with reference to specific exemplary embodiments, it will be recognized that the invention is not limited to the embodiments described, but can be practiced with modification and alteration within the scope of the appended claims. Accordingly, the specification and drawings are to be regarded in an illustrative sense rather than a restrictive sense.

I claim:

1. A method of handling slamdown calls received by a subscriber's mobile device using a who-called service, the method comprising:
    receiving a trigger in response to an incoming call being forwarded to a forwarded entity, wherein the incoming call is placed by a calling party to a subscriber's mobile device;
    analyzing a redirection reason included in the triqger to verify that the incoming call was forwarded to the forwarded entity because of an unreachable state of the subscriber's mobile device;
    detecting a slamdown event that occurs subsequent to the receipt of the trigger, the slamdown event occurring when the calling party abandons the incoming call prior to establishing a connection with the forwarded entity; and
    capturing identification information associated with the calling party only when both the unreachable state and the slamdown event are detected.

2. The method of claim 1, wherein the incoming call is forwarded to the forwarded entity when the subscriber's mobile device is in an unreachable state.

3. The method of claim 2, wherein the trigger is a Customized Application of Mobile Enhanced Logic (CAMEL) originating forwarded Initial Detection Point (IDP) trigger.

4. The method of claim 3, wherein the unreachable state occurs when the subscriber's mobile device is powered off.

5. The method of claim 4, further comprising:
    receiving the CAMEL originating forwarded IDP trigger from a Gateway Mobile Switching Center (GMSC) associated with the subscriber's mobile device.

6. The method of claim 5, wherein the GMSC utilizes a CAMEL Application Part (CAP) protocol to transmit the CAMEL originating forwarded IDP trigger.

7. The method of claim 3, wherein the unreachable state occurs when the subscriber's mobile device is outside of a service area of a Mobile Switching Center (MSC) associated with the subscriber's mobile device.

8. The method of claim 7, further comprising:
    receiving the CAMEL originating forwarded IDP trigger from the MSC associated with the subscriber's mobile device.

9. The method of claim 8, wherein the MSC utilizes a CAMEL Application Part (CAP) protocol to transmit the CAMEL originating forwarded IDP trigger.

10. The method of claim 1, wherein the incoming call is routed to the forwarded entity subsequent to the detection of the unreachable state.

11. The method of claim 10, wherein the forwarded entity includes one of:
    a voicemail component associated with the subscriber's mobile device; or
    a communication device associated with a call-forward number assigned by the subscriber.

12. The method of claim 1, wherein the trigger is independent of a forwarding number associated with the forwarded entity.

13. The method of claim 3, wherein the CAMEL originating forwarded trigger is based on an Originating CAMEL Subscription Information (OCSI) associated with the subscriber's mobile device.

14. The method of claim 13, wherein the OCSI is provisioned as part of the subscriber's profile as indicated in a Home Location Register (HLR) associated with the subscriber's mobile device.

15. The method of claim 14, wherein the OCSI-based trigger enables a carrier associated with the subscriber's mobile device to offer the who-called service as a targeted premium service to selected subscribers of the carrier.

16. The method of claim 1, further comprising:
    storing the captured identification information in a database associated with the who-called service; and
    transmitting a message-waiting alert to a Home Location Register (HLR) associated with the subscriber's mobile device.

17. The method of claim 16, wherein the identification information includes one or more of:
    a phone number of the calling party;
    a time of the incoming call; or
    caller ID information associated with the calling party.

18. The method of claim 17, wherein the identification information associated with the calling party is transmitted to the subscriber's mobile device subsequent to the subscriber's mobile device switching from the unreachable state to a reachable state.

19. The method of claim 18, wherein the identification information is transmitted to the subscriber's mobile device using an SMS service.

20. The method of claim 18, wherein the identification information is transmitted to the subscriber's mobile device using a Unstructured Supplementary Service Data (USSD) service.

21. The method of claim 18, wherein the identification information associated with the calling party is transmitted to a web-server using a Wireless Application Protocol (WAP) push service, enabling the subscriber to view the identification information using a web browser.

22. A method of providing a who-called service on a targeted basis to selected subscribers of a mobile carrier network, the method comprising:
identifying, using an Originating CAMEL Subscription Information (OCSI) based trigger, a redirection reason when a call placed by a calling party to a subscriber is forwarded to a forwarded entity;
analyzing a redirection reason included in the trigger to verify that the incoming call was forwarded to the forwarded entity because of an unreachable state of the subscriber's mobile device;
detecting a slamdown event that occurs subsequent to the receipt of the OCSI based trigger, the slamdown event occurring when the calling party abandons the incoming call prior to establishing a connection with the forwarded entity; and
capturing identification information associated with the calling party that placed the slamdown call only when both the unreachable state and the slamdown call are detected.

23. The method of claim 22, wherein the who-called service is offered as a premium service to the subscriber.

24. The method of claim 22, wherein the slamdown event is detected when the calling party abandons the incoming call prior to establishing a connection with a forwarded entity.

25. The method of claim 24, wherein the OCSI-based trigger is generated when the incoming call is forwarded to the forwarded entity.

26. The method of claim 24, wherein the unreachable state occurs when the subscriber's mobile device is powered off.

27. The method of claim 26, further comprising:
receiving the OCSI-based trigger from a Gateway Mobile Switching Center (GMSC) associated with the subscriber's mobile device.

28. The method of claim 24, wherein the unreachable state occurs when the subscriber's mobile device is outside of a service area of a Mobile Switching Center/Visiting Location Register (MSC) associated with the subscriber's mobile device.

29. The method of claim 28, further comprising:
receiving the OCSI-based trigger from the MSC associated with the subscriber's mobile device.

30. The method of claim 24, wherein the forwarded entity includes one of:
a voicemail component associated with the subscriber's mobile device; or
a communication device associated with a call-forward number assigned by the subscriber.

31. The method of claim 30, wherein the OCSI-based trigger is initiated subsequent to a detection of the unreachable state of the subscriber's mobile device, and wherein the OCSI-based trigger is independent of the incoming call being forwarded to the forwarded entity.

32. The method of claim 22, further comprising:
transmitting a message-waiting alert to a Home Location Register (HLR) associated with the subscriber's mobile device subsequent to capturing the calling party's identification information.

33. The method of claim 32, wherein the identification information includes one or more of:
a phone number of the calling party;
a time of the incoming call; or
caller ID information associated with the calling party.

34. The method of claim 33, wherein the identification information associated with the calling party is transmitted to the subscriber's mobile device subsequent to the subscriber's mobile device switching from the unreachable state to a reachable state.

35. The method of claim 33, wherein the identification information associated with the calling party is transmitted to a web-server, enabling the subscriber to view the identification information using a web browser.

36. A system for handling slamdown calls received by a subscriber's mobile device, the system comprising:
a communication component configured to receive a trigger that is generated in response to an incoming call being forwarded to a forwarded entity, wherein the incoming call is placed by a calling party to a subscriber's mobile device;
a management component configured to:
analyze a redirection reason included in the trigger to verify that the incoming call was forwarded to the forwarded entity because of an unreachable state of the subscriber's mobile device;
detect a slamdown event that occurs subsequent to the receipt of the trigger, wherein the slamdown event occurs when the calling party abandons the incoming call prior to establishing a connection with the forwarded entity associated with the subscriber's mobile device;
capture identification information associated with the calling party upon detecting a slamdown event; and
report the identification information to the subscriber only when both the unreachable state and the slamdown event are detected.

37. The system of claim 36, wherein the trigger is a Customized Application of Mobile Enhanced Logic (CAMEL) originating forwarded Initial Detection Point (IDP) trigger.

38. The system of claim 37, wherein the unreachable state occurs when the subscriber's mobile device is powered off.

39. The system of claim 38, wherein the communication component is further configured to:
receive the CAMEL originating forwarded IDP trigger from a Gateway Mobile Switching Center (GMSC) associated with the subscriber's mobile device; and
utilize a CAMEL Application Part (CAP) communication protocol to receive the CAMEL originating forwarded IDP trigger.

40. The system of claim 37, wherein the unreachable state occurs when the subscriber's mobile device is outside of a service area of a Mobile Switching Center/Visiting Location Register (MSC) associated with the subscriber's mobile device.

41. The system of claim 40, wherein the communication component is further configured to:
receive the CAMEL originating forwarded IDP trigger from the MSC associated with the subscriber's mobile device; and
utilize a CAMEL Application Part (CAP) communication protocol to receive the CAMEL originating forwarded IDP trigger.

42. The system of claim 37, wherein the CAMEL originating forwarded trigger is based on an Originating CAMEL Subscription Information (OCSI) associated with the subscriber's mobile device.

43. The system of claim 42, wherein the OCSI is provisioned as part of the subscriber's profile as indicated in a Home Location Register (HLR) associated with the subscriber's mobile device.

44. The system of claim 43, wherein the OCSI-based trigger enables a carrier associated with the subscriber's mobile device to offer the who-called service as a targeted premium service to selected subscribers of the carrier.

45. The system of claim 36, wherein the communication component is further configured to:
   transmit a message-waiting alert to a Home Location Register (HLR) associated with the subscriber's mobile device.

46. The system of claim 45, wherein the communication component is further configured to:
   receive an alert-subscriber message from the HLR subsequent to the subscriber's mobile device switching from the unreachable state to a reachable state; and
   transmit the identification information associated with the calling party to the subscriber subsequent to receiving the alert-subscriber message;
   wherein the HLR transmits the alert-subscriber message based on the message-waiting alert previously received from the communication component.

* * * * *